US006622198B2

United States Patent
Jones, Jr.

(10) Patent No.: US 6,622,198 B2
(45) Date of Patent: Sep. 16, 2003

(54) LOOK-AHEAD, WRAP-AROUND FIRST-IN, FIRST-OUT INTEGRATED (FIFO) CIRCUIT DEVICE ARCHITECTURE

(75) Inventor: Oscar Frederick Jones, Jr., Colorado Springs, CO (US)

(73) Assignees: United Memories, Inc., Colorado Springs, CO (US); Sony Corporation, Tokyo (JP)

(*) Notice: Subject to any disclaimer, the term of this patent is extended or adjusted under 35 U.S.C. 154(b) by 188 days.

(21) Appl. No.: 09/815,148

(22) Filed: Mar. 22, 2001

(65) Prior Publication Data

US 2002/0138685 A1 Sep. 26, 2002

Related U.S. Application Data

(60) Provisional application No. 60/229,236, filed on Aug. 31, 2000.

(51) Int. Cl.[7] .............................................. G06F 12/00
(52) U.S. Cl. ........................ 711/101; 711/110; 711/167
(58) Field of Search .................................. 711/101, 155, 711/110, 217, 218, 219, 167; 710/52, 39

(56) References Cited

U.S. PATENT DOCUMENTS

| | | | | |
|---|---|---|---|---|
| 4,734,850 A | * | 3/1988 | Torii et al. .................. 711/169 |
| 4,914,652 A | * | 4/1990 | Nguyen ....................... 370/452 |
| 4,951,280 A | * | 8/1990 | McCool et al. ......... 206/387.12 |
| 5,027,326 A | * | 6/1991 | Jones .......................... 365/221 |
| 5,420,997 A | * | 5/1995 | Browning et al. ........... 711/211 |
| 5,646,700 A | * | 7/1997 | Park ........................... 348/718 |
| 5,838,933 A | * | 11/1998 | Molnar et al. .............. 710/305 |
| 5,901,103 A | * | 5/1999 | Harris, II et al. ........... 365/226 |
| 5,978,935 A | * | 11/1999 | Kim et al. .................... 714/42 |
| 5,996,052 A | | 11/1999 | Taniguchi et al. .......... 711/155 |
| 6,026,473 A | * | 2/2000 | Cross et al. ................. 711/157 |
| 6,172,927 B1 | * | 1/2001 | Taylor ........................ 365/219 |
| 6,269,413 B1 | * | 7/2001 | Sherlock ...................... 710/52 |
| 6,366,979 B1 | * | 4/2002 | Narayana et al. ........... 711/109 |

\* cited by examiner

*Primary Examiner*—Hiep T. Nguyen
(74) *Attorney, Agent, or Firm*—William J. Kubida; Peter J. Meza; Hogan & Hartson LLP

(57) ABSTRACT

A method for loading an integrated circuit FIFO at extremely high operating frequencies includes providing N logical locations, providing N+1 transparent latch stages, and providing N+1 write pointers, wherein two write pointers are contemporaneously enabled during a FIFO load operation. The method can be extended to enable three or more write pointers for even higher frequency operation.

8 Claims, 13 Drawing Sheets

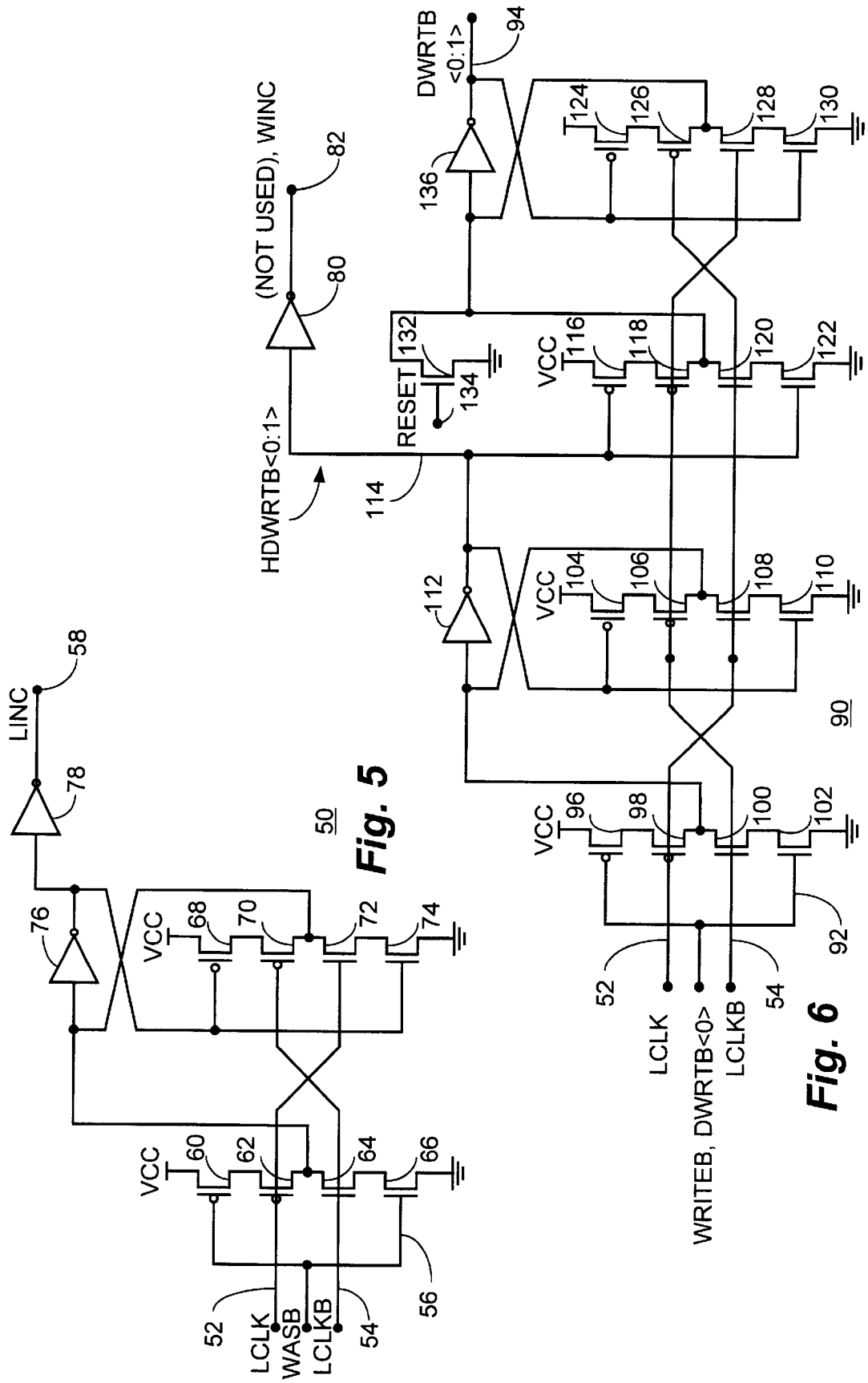

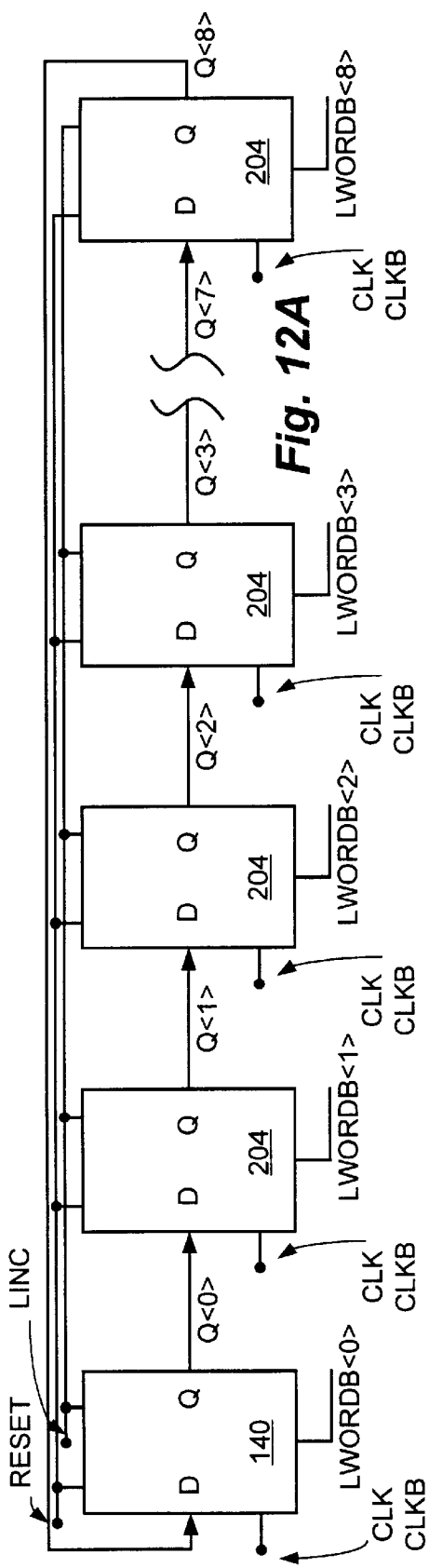
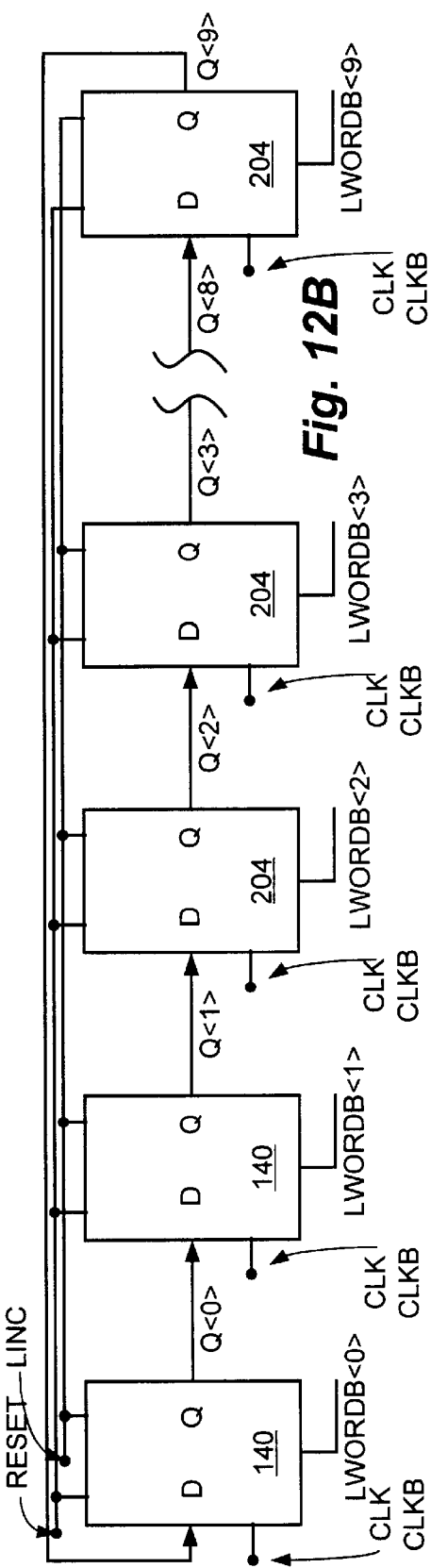
Fig. 12A
Fig. 12B

LOOK-AHEAD, WRAP-AROUND FIRST-IN, FIRST-OUT INTEGRATED (FIFO) CIRCUIT DEVICE ARCHITECTURE

CROSS REFERENCE TO RELATED PATENT APPLICATIONS

The present invention claims priority from U.S. Provisional Patent Application Serial No. 60/229,236 filed Aug. 31, 2000, the disclosure of which is herein specifically incorporated by this reference.

BACKGROUND OF THE INVENTION

The present invention relates, in general, to the field of integrated circuit ("IC") devices. More particularly, the present invention relates to a look-ahead, wrap-around first-in, first-out ("FIFO") integrated circuit device architecture.

U.S. Pat. No. 5,996,052 issued Nov. 30, 1999 describes a conventional method and circuit for enabling a clock-synchronized read-modify-write operation on a memory array. The design illustrated includes a FIFO memory, configured with a predetermined number of memory stages, which is incorporated into the input side of the device address decoder and is used only for writing. The write decoder circuitry of the design shown constitutes a FIFO memory and a write only address decoder.

Conventional data capturing techniques using non-look-ahead FIFOs, as represented by the '052 patent, require extremely tight timing constraints between the data-in and clocking signals. Moreover, in order to ensure overall high speed data input/output ("I/O") operations, read-modify-write operations must be able to complete in the same time frame as read only cycles.

SUMMARY OF THE INVENTION

In order to implement such high speed data I/O operations, a write address FIFO is disclosed herein which, in an exemplary embodiment is organized as an eight stage by 6 bits configuration, that may be operated in a wrap-around fashion and wherein conventional status flags (i.e. full, half-full, empty, etc.) are not required. The particular embodiment of the FIFO of the present invention is able to operate at 714 MHz (1.4 ns cycle time) or faster and data loaded into the FIFO is available for read accessing from the output of the FIFO one cycle after it is loaded. In essence, the design disclosed serves to effectively minimize device power requirements while simultaneously enabling high speed operation utilizing separate read data and write address data paths to the memory array.

Functionally, a unique latching technique is utilized such that data is transparently captured into a FIFO stage implemented in the form of a single stage latch which functions as the storage element. More specifically, the technique disclosed herein serves to initialize the latency level of the first stage of the FIFO in the "enabled" (or "transparent") state whereby it becomes "inactive" when a load command is executed. When the load command is executed to the first stage, its latch is "disabled", but the following stage's latch becomes "active" in anticipation of the next stage being loaded by a subsequent load command. Latching in this fashion results in a single-cycle, look-ahead function.

In an exemplary embodiment, since the latching sequence operates in a single cycle look-ahead manner, it is desirable to utilize N+1 FIFO stages, where N is the stage depth of the FIFO. Using this as an example, an eight-stage FIFO would then require nine FIFO stages to implement single-cycle look-ahead functionality. This wrap-around operation can continue as long as the following condition is satisfied:

$$NL-NR \leq T$$

where NL is the number of loads; NR is the number of reads and T is the logical depth of the FIFO. In other words, a nine-stage FIFO using single-cycle look-ahead provides an eight-stage logical depth and $$NL-NR \leq 8$$

By extending the transparent single-cycle latching technique disclosed herein, the frequency performance of a DRAM memory macro can be greatly improved at only a slight increase in power requirements through the use of two-cycle, look-ahead operation. In this manner, the timing constraints otherwise associated with enabling the latch on the same cycle as a load command occurs are removed even further increasing the ease in handling back-to-back loads and enabling even higher frequency operation.

Utilizing this technique, when a FIFO load occurs implemented with two-cycle look-ahead operation, the latching signal for the targeted stage goes "inactive" (i.e. capturing data or "disabled load") while the next stage remains "active" (i.e. "transparent loading") and the latch on the following stage (two stages after the loaded stage) goes "active" in such a way that there are always two stages with their latches "active" (or "enabled"). When this two-stage transparency operation is implemented, N+2 stages are required for wrap-around operation for a FIFO stage equivalency of N stages.

Wrap-around operation in this manner then also requires:

$$NL-NR \leq T$$

as for the previously described single-cycle look-ahead function. With respect to the exemplary embodiments disclosed herein, a primary difference between one-stage and two-stage look-ahead operation is the generation of the LWORDB and WWORDB signal and the number of stages in the FIFO (or CWRBIT circuits).

Particularly disclosed herein is a DRAM macro which employs only a single common set of column address inputs for reading and writing data. A write address FIFO and independent internal read and write address and data paths allow for simultaneous read/write operation which effectively doubles the data rate for read-modify-write or read-write cycles. For a read cycle, the column address is loaded into a write address FIFO for use in a later write cycle. In each clock cycle where the write address strobe ("WASB") is active "low", the in-coming column address is loaded into an eight stage FIFO. Although the FIFO stores eight addresses, there are nine stages, in the case of single cycle look-ahead loading, so that the load pointer can "look-ahead" for improved FIFO speed. In each write cycle (WRITEB "low"), a write address is read from the FIFO and sent to the write column decoders and a column address can be loaded into the FIFO during a read cycle. This means that the read address can be stored in the FIFO and retrieved in a subsequent write cycle without having to supply a write address to the macro. This feature provides read-modify-write operation with simultaneous read and write cycles and only the read addresses need be supplied to the macro. It should also be noted that write only cycles may also be implemented through the conjunctive use of the WASB and WRITE commands.

BRIEF DESCRIPTION OF THE DRAWINGS

The aforementioned and other features and objects of the present invention and the manner of attaining them will become more apparent and the invention itself will be best understood by reference to the following description of a preferred embodiment taken in conjunction with the accompanying drawings, wherein:

FIG. 5 is a detailed schematic illustration of a column address load control circuit ("CLCNTL") in accordance with a representative embodiment of the look-ahead, wrap-around FIFO of the present invention;

FIG. 6 is a detailed schematic illustration of a latch circuit for use in conjunction with the representative embodiment of the look-ahead, wrap-around FIFO of the present invention;

FIGS. 12A and 12B are functional block diagrams of two embodiments of a load pointer ("LWORD") look-ahead, wrap-around FIFO of the present invention illustrating the interconnection of a single column address write shift register 1 (FIG. 7) in conjunction with eight column address write shift registers 2 (FIG. 8) in a single look-ahead configuration and two column address write shift registers 1 in conjunction with nine column address write shift registers 2 in a two stage look-ahead configuration respectively;

DESCRIPTION OF A REPRESENTATIVE EMBODIMENT

Figure 1:
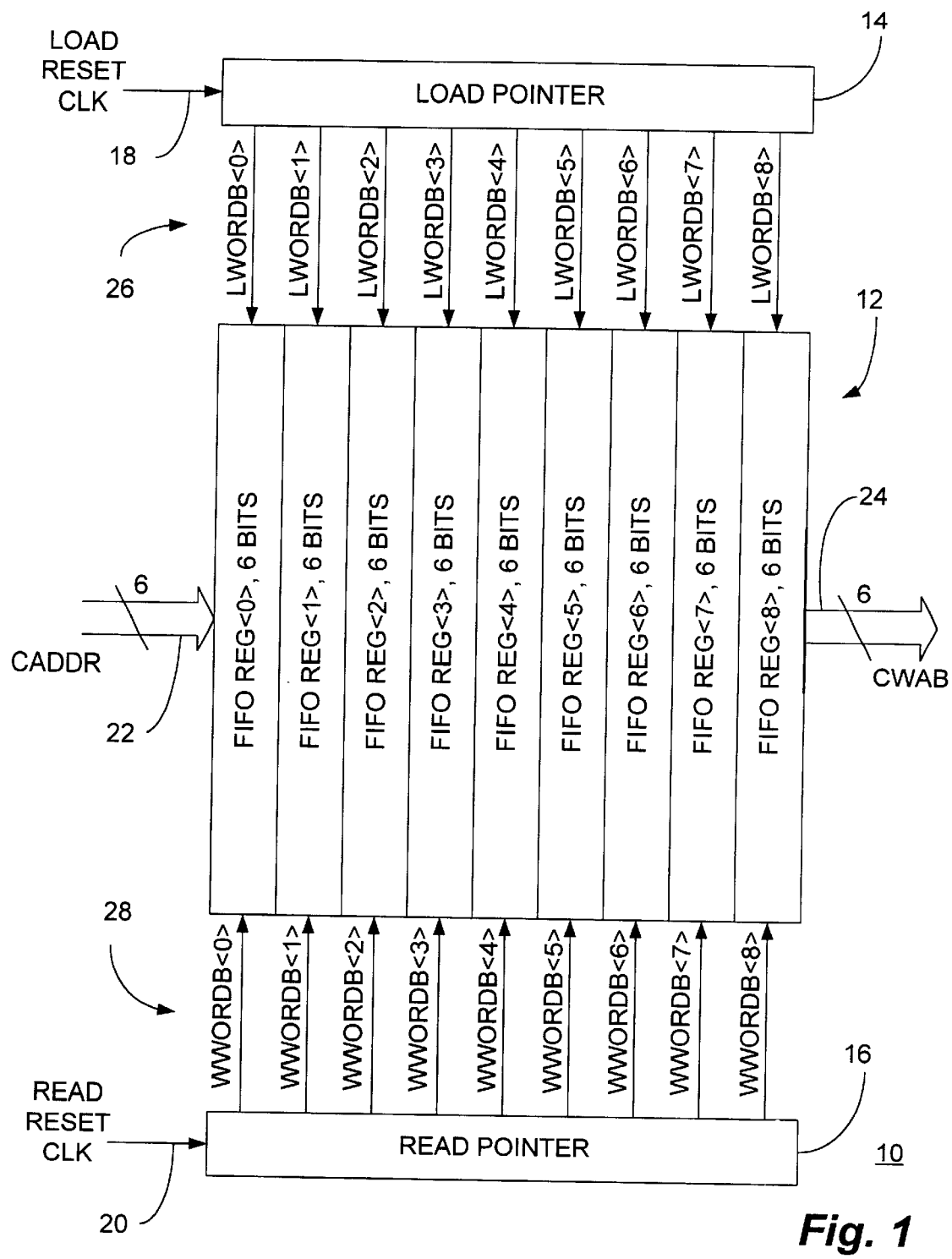
FIG. 1 is a simplified functional block diagram of a one-stage look-ahead, wrap-around FIFO having an eight-stage (logical depth) x six bit configuration in accordance with a particular embodiment of the present invention.
Figure 2:
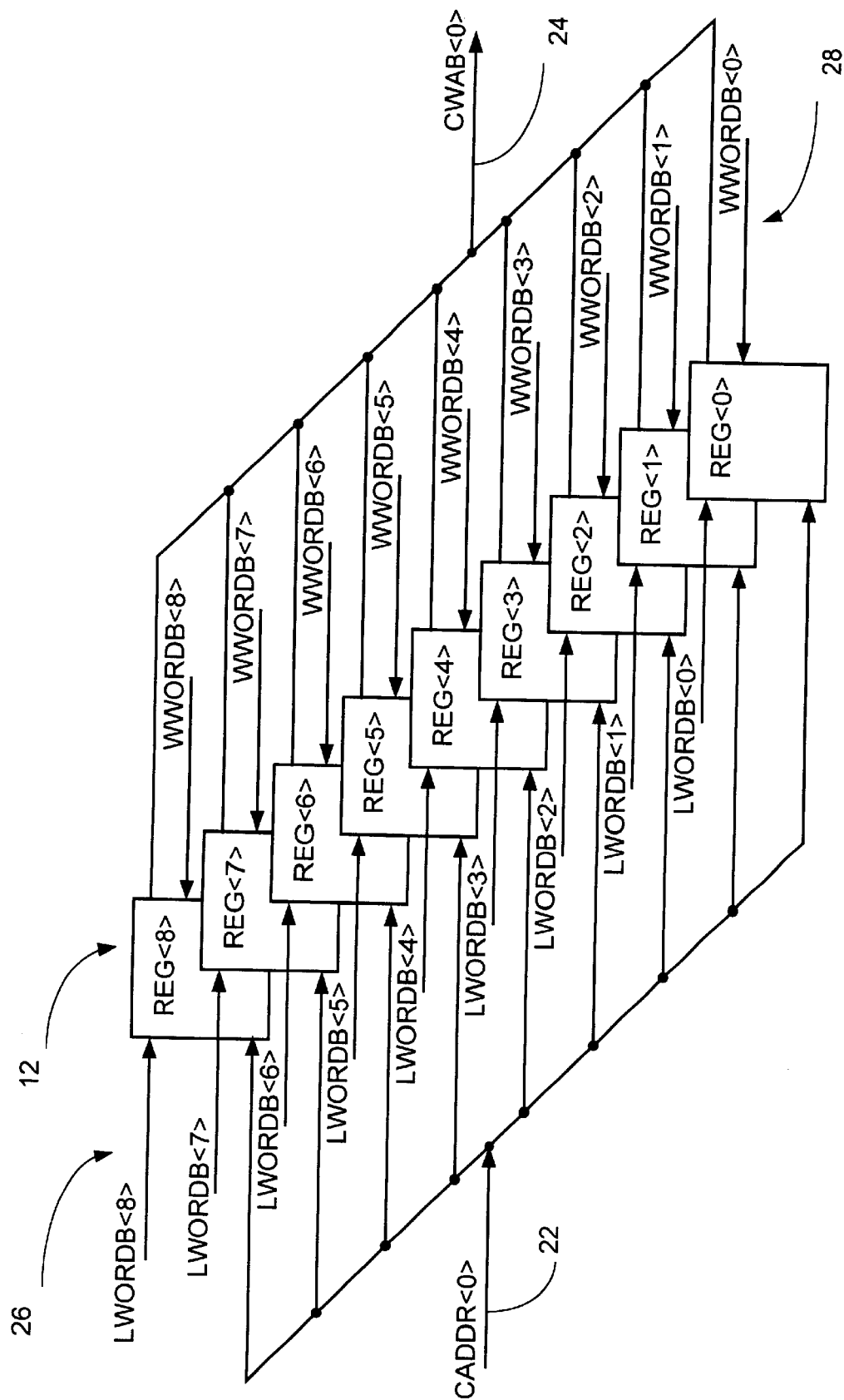
FIG. 2 is another conceptual block diagram illustration of the FIFO of FIG. 1 having a one-stage look-ahead load.

With reference now to FIGS. 1 and 2, a simplified functional block diagram and a conceptual block diagram of a one-stage look-ahead, wrap-around FIFO 10 are shown. The FIFO 10 has an eight-stage (logical depth) x six bit register 12 configuration in accordance with a particular embodiment of the present invention.

The FIFO 10 further comprises a load pointer 14 and read pointer 16 associated with the registers 12. The load pointer 14 receives a load, reset and clock signals on line 18 while the read pointer 16 receives a read, reset and clock signals on line 20. The registers 12 receive input data in the form of column addresses ("CADDR") on a six-bit wide address bus 22 and output column write address bar ("CWAB") data on a corresponding six-bit wide bus 24. The load pointer 14 provides a number of load word ("LWORDB") signals LWORDB<0:8> on lines 26 to the registers 12 while the read pointer 16 also provides a number of write word bar ("WWORDB") signals WWORDB<0:8> on lines 28 wherein data is read from the FIFO 10.

In single cycle look-ahead operation, one of the LWORDB<0:8> signals on the lines 26 is active at a time. When one of the lines 26 transitions from a logic "low" to logic "high" state, the subsequent line 26 then transitions to a logic "low" state in preparation for a subsequent "load" command. The latches of the FIFO 10 include transparent data latches and since wrap-around can occur prior to the full desired depth, an extra stage is incorporated to allow the transparent look-ahead loading. This allows data to be loaded at very high data rates, while eliminating the need for critical timing for both data-in and latch timing. Only the clock timing is critical, even at very high frequencies of operation. Moreover, since transparent latching is used, the read access time from the FIFO is extremely short while keeping power dissipation low because only one stage is in the transparent mode and dissipating AC power. All inputs to the registers 12 are coupled together and all outputs of a single bit of the FIFO 10 may be logically "OR'd". The LWORDB signal is a logic "low" true signal which is utilized to load the FIFO 10 stages sequentially. The WWORDB signal is also a logic "low" true signal and is used to read from the FIFO 10 stages sequentially.

Figure 3:
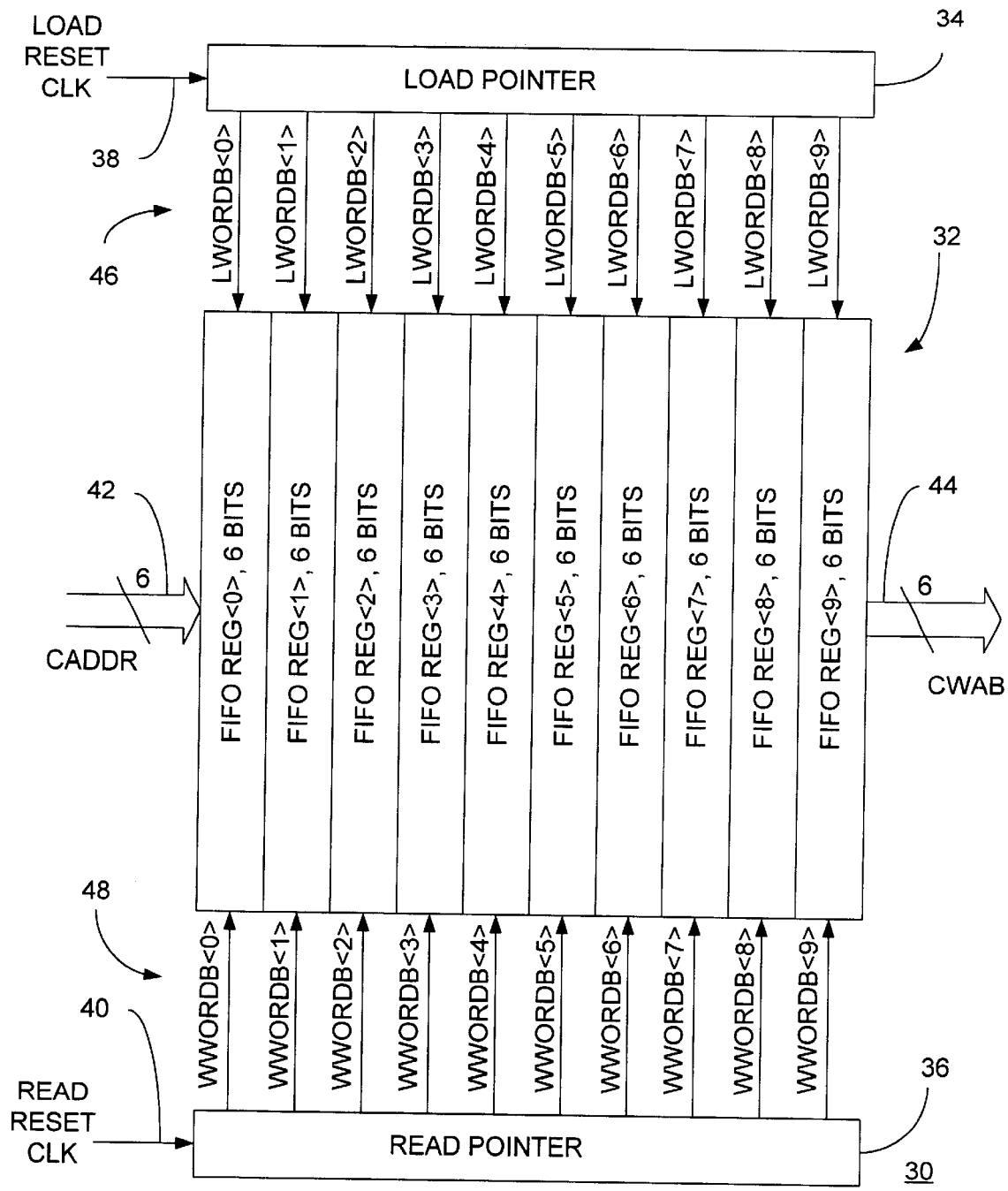
FIG. 3 is a simplified functional block diagram of a two-stage look-ahead, wrap-around FIFO having an eight-stage (logical depth) x six bit configuration in accordance with another particular embodiment of the present invention.
Figure 4:
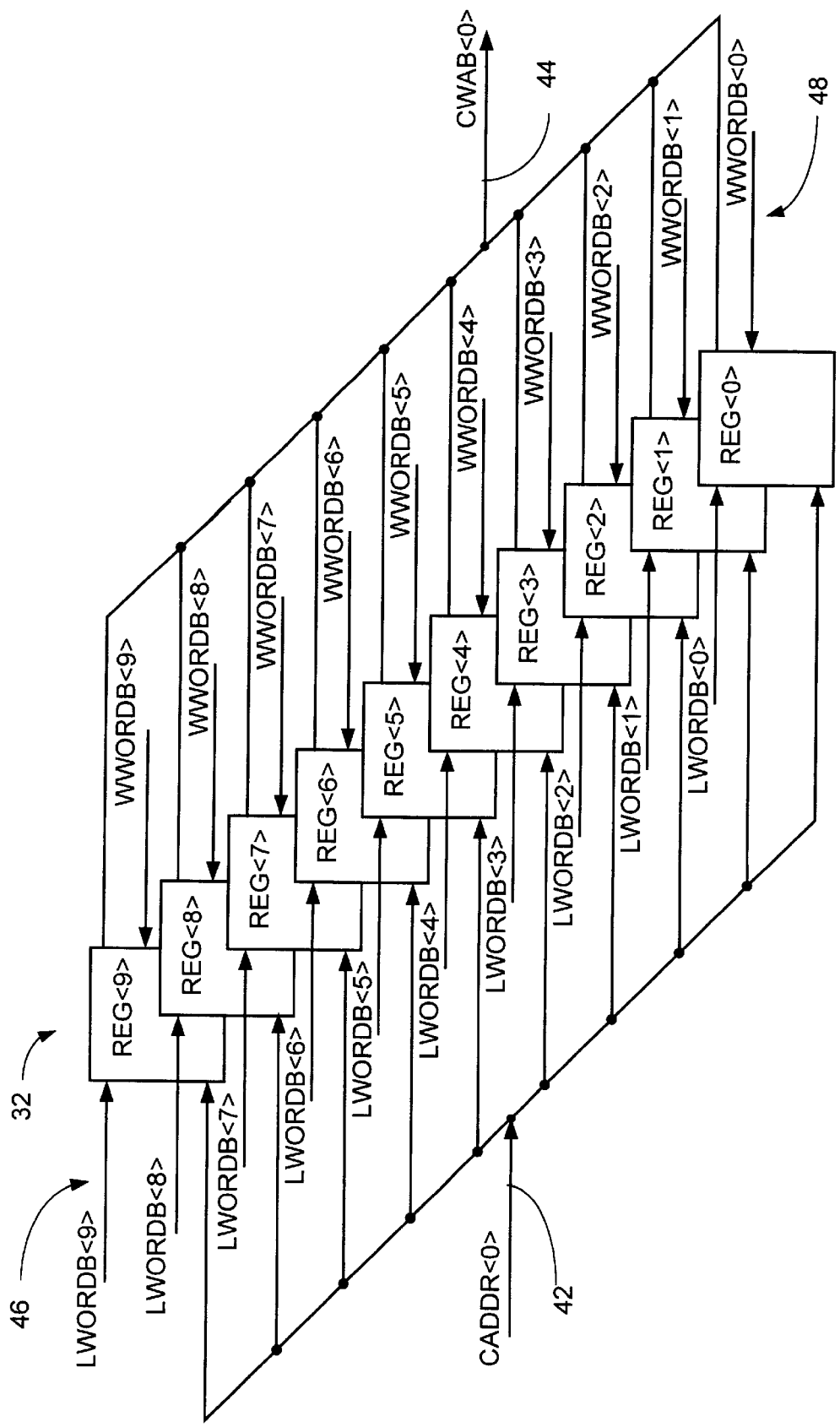
FIG. 4 is another conceptual block diagram illustration of the FIFO of FIG. 3 having a two-stage look-ahead load.

With reference additionally now to FIGS. 3 and 4, a simplified functional block diagram and a conceptual block diagram of a two-stage look-ahead, wrap-around FIFO 30 are shown. The FIFO 30 has an eight-stage (logical depth) x six bit register 32 configuration in accordance with another particular embodiment of the present invention.

As with the embodiment of the preceding figures, the FIFO 30 further comprises a load pointer 34 and read pointer 36 associated with the registers 32. The load pointer 34 receives a load reset and clock signals on line 38 while the read pointer 36 receives a read reset and clock signals on line 20. The registers 32 receive column addresses ("CADDR") on a six-bit wide address bus 42 and output column write address bar ("CWAB") data on a corresponding six-bit wide bus 44. The load pointer 34 provides a number of load word ("LWORDB") signals LWORDB<0:9> on lines 46 to the registers 12 while the read pointer 36 also provides a number of write word bar ("WWORDB") signals WWORDB<0:9> on lines 48.

In operation, two of the LWORDB<0:9> signals on the lines 26 are active at a time. When one of LWORDB signals on lines 26 transitions from a logic "low" to logic "high" state, the subsequent LWORDB signal remains at a logic "low" state and the LWORDB following the active LWORDB goes "low" in preparation for a subsequent "load" command.

As with the embodiment of FIGS. 1 and 2, certain of the latches of the FIFO 30 are transparent latches but, in this embodiment, an extra two stages (instead of one for the case of single cycle look-ahead loading) are incorporated to further facilitate the transparent look-ahead loading. This further enhances the ability to load data at very high data rates, while still eliminating the need for critical timing for both data-in and latch timing. Again, only the clock timing is critical, even at very high frequencies of operation. Moreover, since transparent latching is used, the read access time is still extremely short while keeping power dissipation low because only two stages are in the transparent latching (capture) mode and dissipating AC power. As currently contemplated, only one (FIGS. 1 and 2) or two stages (FIGS. 3 and 4) of look-ahead capturing is needed as additional look-ahead stages are not seen to significantly improve high frequency performance while ultimately requiring concomitantly higher operating power for each additional stage.

The two-stage look-ahead approach of FIFO 30 in particular, (but also the one-stage look-ahead of FIFO 10) provides high speed loading and reduces the critical timing signal (clock only) to a single signal since data timing is no longer as critical. This is accomplished while also minimizing power dissipation and is particularly well suited for applications where wrap-around operation is to be utilized without the use of conventional FIFO status flags.

With reference additionally now to FIG. 5, a detailed schematic illustration of a column address load control circuit 50 ("CLCNTL") in accordance with a representative embodiment of the look-ahead, wrap-around FIFO of the present invention is shown. The circuit 50 receives complementary load clock ("LCLK") and load clock bar ("LCLKB") signals on lines 52 and 54 respectively in addition to a write address strobe bar ("WASB") signal on line 54 to provide a load increment ("LINC") output signal on line 58.

Series connected P-channel transistors 60, 62 and series connected N-channel transistors 64, 66 couple a source of supply voltage ("VCC") to circuit ground (or "VSS"). The gates of transistors 60 and 66 are coupled together at line 54 while the gate of transistor 62 is coupled to line 52 and the gate of transistor 64 is coupled to line 54. Another series connected transistor string comprising P-channel transistors 68. 70 and N-channel transistors 72, 74 are coupled between VCC and VSS. The gate of transistor 70 is coupled to line 54 while the gate of transistor 72 is coupled to line 52.

An inverting amplifier 76 has its input coupled to the output node intermediate transistors 62 and 64 as well as to the output node intermediate transistors 70 and 72. Its output is coupled to the gate terminals of transistors 68 and 74 as well as to the input of another inverting amplifier 78. The output of inverting amplifier 78 provides the LINC signal on line 58.

With reference additionally now to FIG. 6, a detailed schematic illustration of a latch circuit 90 for use in conjunction with the representative embodiment of the look-ahead, wrap-around FIFO of the present invention is shown. The latch circuit 90 also receives the LCLK and LCLKB signals on lines 52, 54 as well as either a WRITEB or DWRTB<0> signal on line 92. In turn, the latch circuit 90 provides a one of a DWRTB<0:1> signal on line 94. The latch circuit 90 is used to generate the signal WINC and to move the WWORD pointer whenever there is a Write command. In other words, the latch circuit 90 generates a WINC signal each time the read pointer of the FIFO needs to be advanced. In the particular implementation of the present invention disclosed, a Write command causes the FIFO read pointer to be advanced since the FIFO contains Write addresses.

The latch circuit 90 comprises four sets of series connected transistors comprising P-channel transistors 96, 98 in series with N-channel transistors 100, 102; P-channel transistors 104, 106 in series with N-channel transistors 108, 110; P-channel transistors 116, 118 in series with N-channel transistors 120, 122 and P-channel transistors 124, 126 in series with N-channel transistors 128, 130 each series string coupled between VCC and VSS. The LCLK signal on line 52 is coupled to the gate terminal of transistors 98, 108, 120 and 126 while the LCLKB signal on line 54 is coupled to the gate terminal of transistors 100, 106, 118 and 128. The gate terminals of transistors 96 and 102 are coupled to the input of the latch circuit 90 on line 92.

The output nodes intermediate transistors 98, 100 and 106, 108 are coupled to the input of an inverting amplifier 112 which has its output coupled to the gate terminal of transistors 104 and 110 as well as to one of an HDWRTB<0:1> signals on line 114 which is also coupled to the gate terminal of transistors 116 and 122. The signals on line 114 are inverted by means of an inverter 80 to provide either a (not used) signal or WINC signal on line 82.

The output nodes intermediate transistors 118, 120 and 126, 128 are coupled to the input of another inverting amplifier 136 which has its output coupled to output line 94 as well as to the gate terminal of transistor 124 and 130. The input of the inverting amplifier 136 is also selectively coupled to VSS through an N-channel transistor 132 which receives a RESET signal at its gate, which is coupled to line 134. It should be noted that, in the present invention, the latch circuit 90 is used twice, with one implementation having the input signal WRITEB and the other the input signal DWRTB<0> respectively. The output of the first instance is then DWRTB<0> and that of the second DWRTB<1>. The signal DWRTB<0> is coupled to the input of the second instance of the latch circuit 90 and the signal DWRTB<1> is not used. The signals on line 114 are HDWRTB<0> and HDWRT<1> respectively for the two instances of the latch circuit 90 and only the inverted output of HDWRTB<1> is used and denominated as WINC. The WINC signal on line 82 is used to advance WWORDB, the read pointer of the FIFO.

Figure 7:
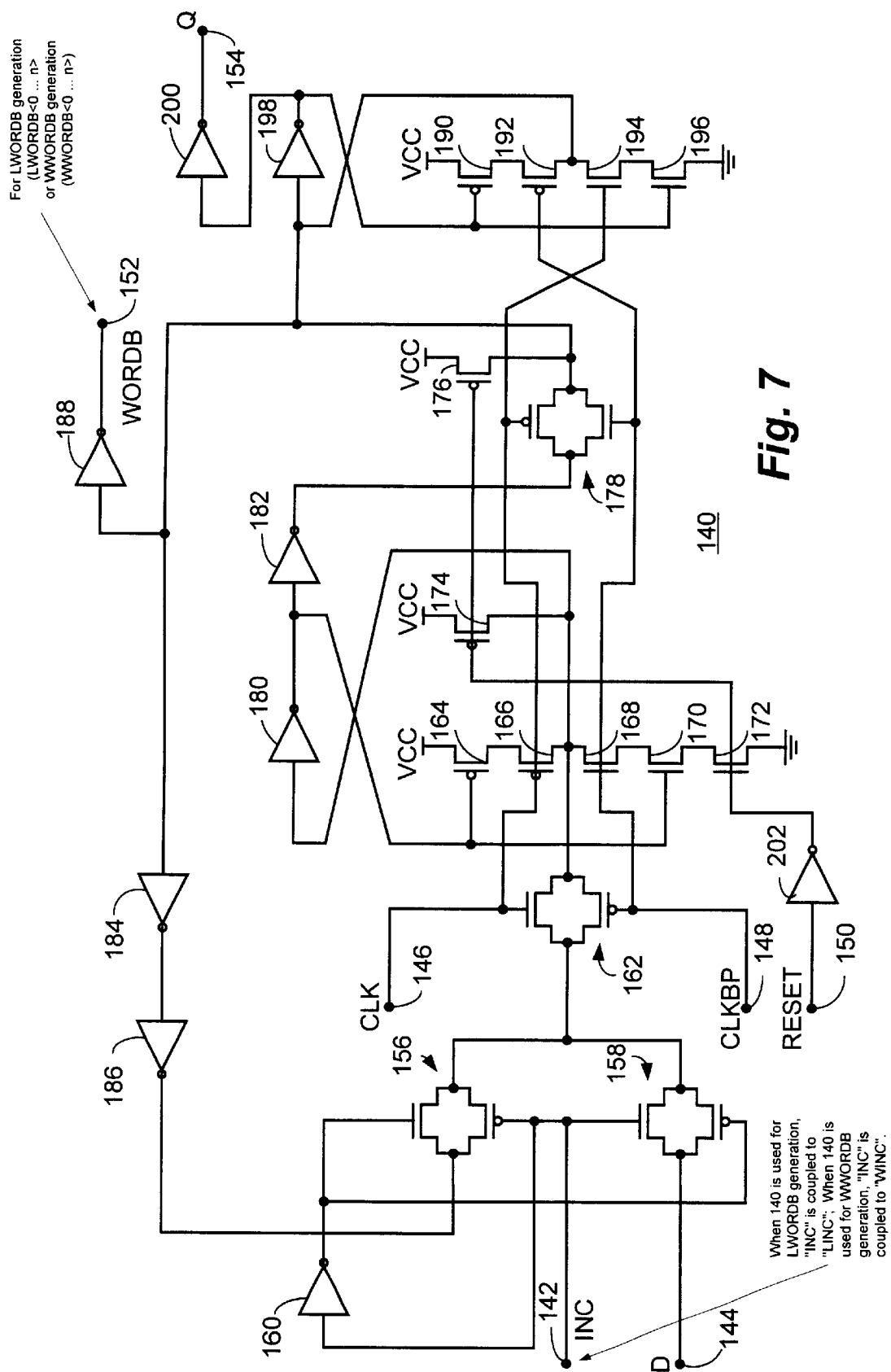
FIG. 7 is a detailed schematic illustration of a column address write shift register 1 ("CWSHIFT1") for use in conjunction with the representative embodiment of the look-ahead, wrap-around FIFO of the present invention.

With reference additionally now to FIG. 7, a detailed schematic illustration of a column address write shift register 140 ("CWSHIFT1") is shown. The shift register 140 receives an increment ("INC") signal on line 142 and a data ("D") input signal on line 144. In addition, the shift register 140 receives a clock ("CLK") and clock bar phase ("CLKBP") signals on line 146 and 148 and a RESET signal on line 150 to ultimately provide a WORDB<0> signal on line 152 and a data output ("Q<0>") signal on line 154.

The INC signal on line 142 is coupled to the signal LINC ("Load Increment" advance load pointer on line 58, FIG. 5) when the shift register 140 is used for LWORDB generation on line 152. Alternatively, the INC signal on line 142 is coupled to the signal WINC ("Write Increment" advance read pointer on line 82, FIG. 6) when the shift register 140 is used for WWORDB generation on line 152. In other words, when the shift register 140 is used for LWORDB generation, the signal WORDB on line 152 becomes a substantiation of LWORDB and when used for WWORDB generation, WORDB becomes a substantiation of WWORDB.

Line 142 is coupled to the gate of a P-channel transistor of CMOS pass gate 156 as well as the gate of an N-channel transistor of pass gate 158. The signal on line 142 is inverted through an inverting amplifier 160 and applied to the gate of the N-channel transistor of pass gate 156 and the gate of the P-channel transistor of pass gate 158. Line 144 is coupled to the input of pass gate 158.

The outputs of pass gates 156, 158 are supplied to the input of another CMOS pass gate 162 which receives a clock ("CLK") signal at the gate of its N-channel transistor and a complementary clock bar ("CLKB") signal at the gate of its P-channel transistor. A series coupled transistor string comprising P-channel transistors 164, 166 and N-channel transistors 168, 170 and 172 is coupled between VCC and VSS. The CLK signal on line 146 and the CLKB signal on line 148 are respectively coupled to the gate terminals of transistors 166 and 168. The output of pass gate 162 and the output node intermediate transistors 166, 168 is coupled to one terminal of P-channel transistor 174 which has its other terminal coupled to VCC. The output node intermediate transistors 166, 168 is also coupled to the input of an inverting amplifier 180 which has its output coupled to the gate terminal of transistors 164 and 170 as well as to the input of another inverting amplifier 182. The output of inverting amplifier 182 is coupled to the input of a pass gate 178 which has its output coupled to the input of series connected inverting amplifiers 184 and 186. The output of inverting amplifier 186 is coupled to the input of pass gate 156. Another inverting amplifier 188 has its input coupled to the output of pass gate 178 and has its output coupled to line 152.

Another P-channel transistor 176 is coupled between the output of pass gate 178 and VCC and has its gate terminal coupled to the gate terminal of transistors 174 and 172 which, in turn, receive the RESET signal on line 150 through inverting amplifier 202. A series coupled transistor string comprising P-channel transistors 190, 192 and N-channel transistors 194, 196 are coupled between VCC and VSS. The gate terminal of transistor 192 is coupled to receive the CLKBP signal on line 148 while the gate terminal of transistor 194 is coupled to receive the CLK signal on line 146. The output node intermediate transistors 192, 194 is coupled to the input of an inverting amplifier 198 which is also coupled to the output of the pass gate 178. The output of the inverting amplifier 198 is coupled to the gate terminal of transistors 190 and 196 as well as to the input of another inverting amplifier 200, which has its output coupled to line 154 to supply the data out signal Q<0>.

The shift register 140 is operative such that a logic "high" signal level on line 150 causes the output WORDB<0> signal on line 152 to go a "low" enable state. For use in a "read" operation, the WORDB<0> signal on line 152 will correspond to a "load pointer" or "load word" signal LWORDB<0> in a single look-ahead operation or one of LWORDB<0> or LWORDB<1> in a two cycle look-ahead function. In a "write" operation, the WORDB<0> will correspond to a "write word" signal WWORDB<0> regardless of whether used in a single cycle or two cycle look-ahead operation.

Figure 8:
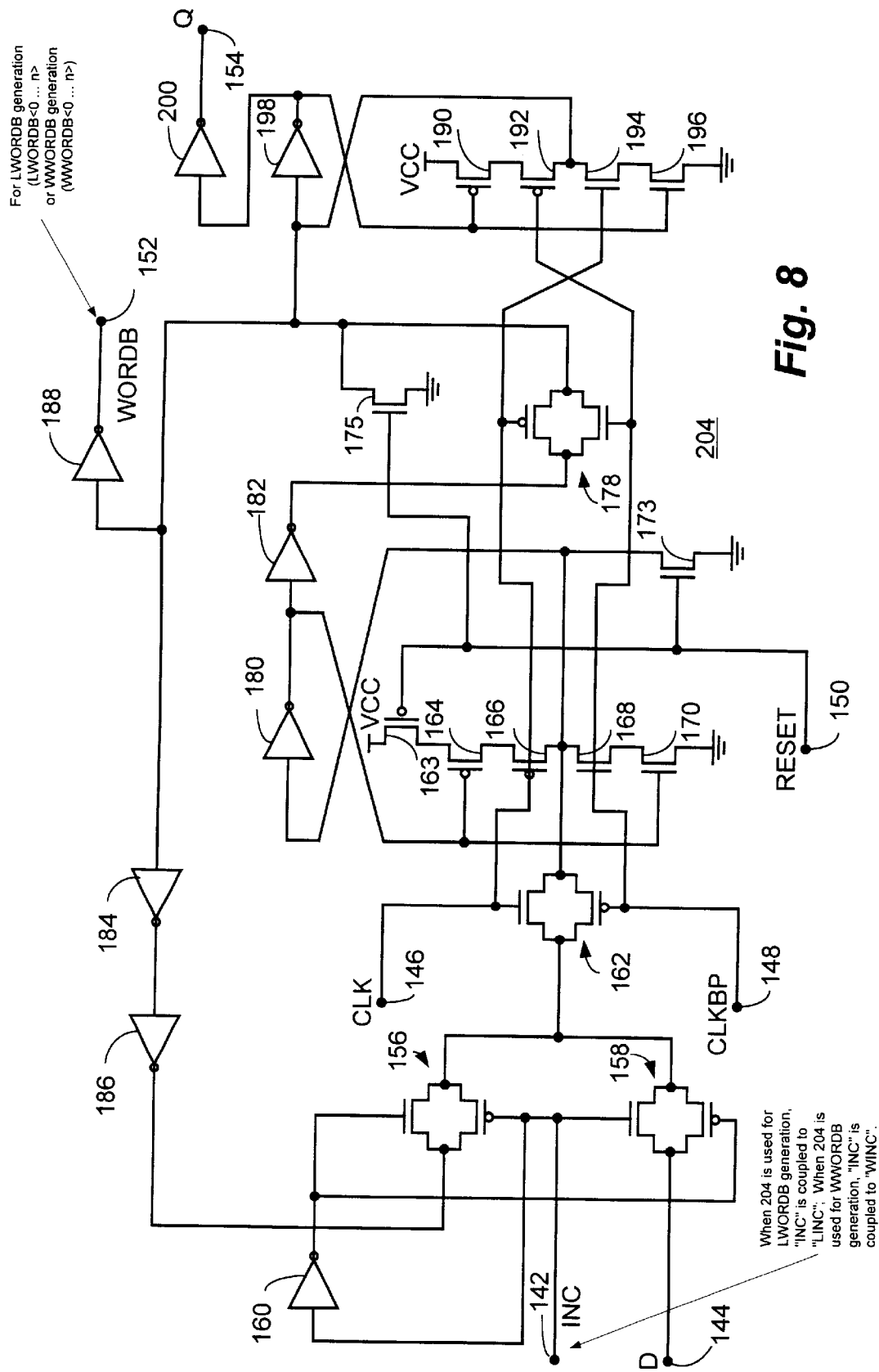
FIG. 8 is a detailed schematic illustration of a corresponding column address write shift register 2 ("CWSHIFT2") for use in conjunction with the representative embodiment of the look-ahead, wrap-around FIFO of the present invention.

With reference additionally now to FIG. 8, a detailed schematic illustration of a corresponding, and similar, column address write shift register 204 ("CWSHIFT2") is shown. The shift register 204 receives an increment ("INC") signal on line 142 and a data ("D") input signal on line 144. In addition, the shift register 204 receives a clock ("CLK") and clock bar phase ("CLKBP") signals on lines 146 and 148 and a RESET signal on line 150 to ultimately provide a WORDB<1:8> signal on line 152 and a data output ("Q<1:8>") signal on line 154.

The INC signal on line 142 is coupled to the signal LINC ("Load Increment" advance load pointer on line 58, FIG. 5) when the shift register 204 is used for LWORDB generation on line 152. Alternatively, the INC signal on line 142 is coupled to the signal WINC ("Write Increment" advance read pointer on line 82, FIG. 6) when the shift register 204 is used for WWORDB generation on line 152. In other words, when the shift register 204 is used for LWORDB generation, the signal WORDB on line 152 becomes a substantiation of LWORDB and when used for WWORDB generation, WORDB becomes a substantiation of WWORDB.

Line 142 is coupled to the gate of a P-channel transistor of CMOS pass gate 156 as well as the gate of an N-channel transistor of pass gate 158. The signal on line 142 is inverted through an inverting amplifier 160 and applied to the gate of the N-channel transistor of pass gate 156 and the gate of the P-channel transistor of pass gate 158. Line 144 is coupled to the input of pass gate 158.

The outputs of pass gates 156, 158 are supplied to the input of another CMOS pass gate 162 which receives a clock ("CLK") signal at the gate of its N-channel transistor and a complementary clock bar ("CLKB") signal at the gate of its P-channel transistor. A series coupled transistor string comprising P-channel transistors 163, 164 and 166 with N-channel transistors 168, 170 and 172 is coupled between VCC and VSS. The CLK signal on line 146 and the CLKB signal on line 148 are respectively coupled to the gate terminals of transistors 166 and 168. The output of pass gate 162 and the output node intermediate transistors 166, 168 is coupled to one terminal of N-channel transistor 173 which has its other terminal coupled to VSS. The output node intermediate transistors 166, 168 is also coupled to the input of an inverting amplifier 180 which has its output coupled to the gate terminal of transistors 164 and 170 as well as to the input of another inverting amplifier 182. The output of inverting amplifier 182 is coupled to the input of a pass gate 178 which has its output coupled to the input of series connected inverting amplifiers 184 and 186. The output of inverting amplifier 186 is coupled to the input of pass gate 156. Another inverting amplifier 188 has its input coupled to the output of pass gate 178 and has its output coupled to line 152.

Another N-channel transistor 175 is coupled between the output of pass gate 178 and VSS and has its gate terminal coupled to the gate terminal of transistors 163 and 173 which are coupled to receive the RESET signal on line 150. A series coupled transistor string comprising P-channel transistors 190, 192 and N-channel transistors 194, 196 are coupled between VCC and VSS. The gate terminal of transistor 192 is coupled to receive the CLKBP signal on line 148 while the gate terminal of transistor 194 is coupled to receive the CLK signal on line 146. The output node intermediate transistors 192, 194 is coupled to the input of an inverting amplifier 198 which is also coupled to the output of the pass gate 178. The output of the inverting amplifier 198 is coupled to the gate terminal of transistors 190 and 196 as well as to the input of another inverting amplifier 200, which has its output coupled to line 154 to supply the data out signal Q<1:8>.

The shift register 204 is operative such that a logic "high" signal level on line 150 causes the output WORDB<0> signal on line 152 to go a "high" disable state. For use in a "read" operation, the WORDB<0> signal on line 152 will correspond to a "load pointer" or "load word" signal LWORDB<1:8> in a single look-ahead operation or one of LWORDB<2:9> in a two cycle look-ahead function. In a "write" operation, the WORDB<0> signal will correspond to one of a "write word" signal WWORDB<1:8> (single cycle look-ahead) or WWORD<1:9> (two cycle look-ahead).

From the foregoing, it should be noted that the shift register 140 of FIG. 7 and the shift register 204 of FIG. 8 are substantially identical except for the RESET section. In the implementation of the shift register 140 (FIG. 7), a "high" RESET signal on line 150 results in the output signal Q on line 154 going "high" while in the implementation of the shift register 204 (FIG. 8), a "high" RESET signal on line 150 results in the output signal Q on line 154 going "low". This is important in setting the correct operating conditions for the LWORDB and WWORDB shift registers. As will be shown more fully hereinafter with respect to FIGS. 12A, 12B and 13, the different RESET signals produced by the shift registers 140 and 204 are used in the generation of the LWORDB and WWORDB signals.

Figure 9:
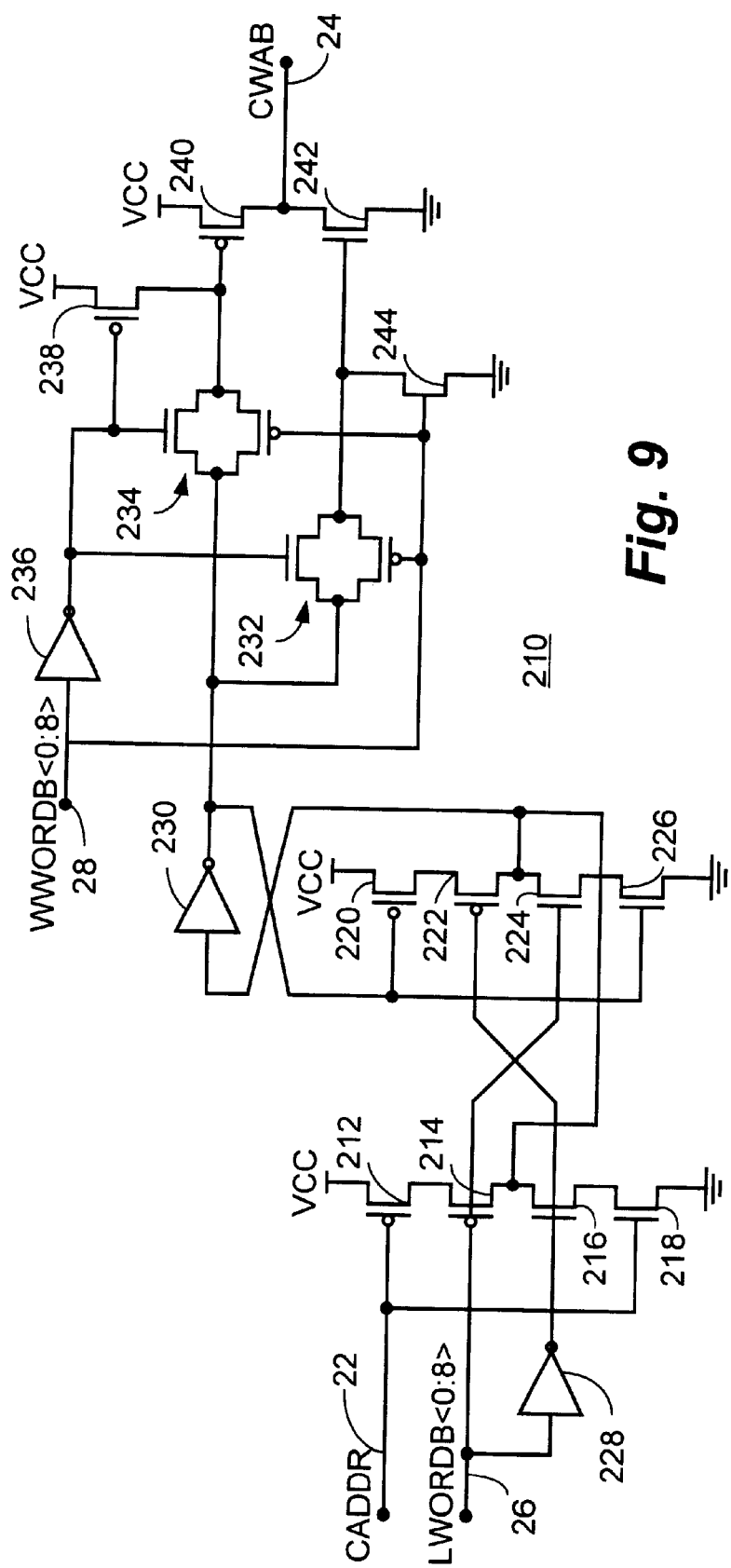
FIG. 9 is a detailed schematic illustration of a column address write register ("CWRBIT"; i.e. one bit of one stage of the FIFO) for use in conjunction with the representative embodiment of the look-ahead, wrap-around FIFO of the present invention.

With reference additionally now to FIG. 9, a detailed schematic illustration of a column address write register 210 ("CWRBIT"; i.e. one bit of one stage of the FIFO) is shown for use in conjunction with the representative embodiment of the look-ahead, wrap-around FIFO of the present invention. The register 210 receives a CADDR signal on line 22, an LWORDB<0:8> signal on line 26 and a WWORDB<0:8> signal on line 28 to provide a CWAB signal on line 24.

A pair of series connected transistors strings comprising P-channel transistors 212, 214 in series with N-channel transistors 216, 218 as well as P-channel transistors 220, 222 in series with N-channel transistors 224, 226 are coupled between VCC and VSS. The gate terminals of transistors 212, 218 are coupled to line 22 while the gate terminals of transistors 214 and 224 are coupled to line 26. The LWORDB<0:8> signal on line 26 is inverted through an inverting amplifier 228 and supplied to the gate terminals of transistors 216 and 222.

The output nodes intermediate transistors 214, 216 and transistors 222, 224 are coupled to the input of another inverting amplifier 230 which has its output coupled to the gate terminal of transistors 220 and 226 as well as to the input of a pair of CMOS pass gates 232, 234. Line 28 is coupled through an inverting amplifier 236 to the gate of the N-channel transistors of pass gates 232, 234 as well as to the gate of a P-channel transistor 238. The line 28 is also directly coupled to the gate of the P-channel transistors of pass gates 232, 234 as well as to the gate of an N-channel transistor 244. The P-channel transistor is coupled between VCC and the output node of pass gate 234 while the N-channel transistor 244 is coupled between the output node of pass gate 232 and VSS.

Series connected P-channel transistor 240 and N-channel transistor 242 are coupled between VCC and VSS with the gate terminal of transistor 240 coupled to the output of pass gate 234 while the gate terminal of transistor 242 is coupled to the output of pass gate 232. The output node intermediate transistors 240, 242 is coupled to line 24.

Figure 10:
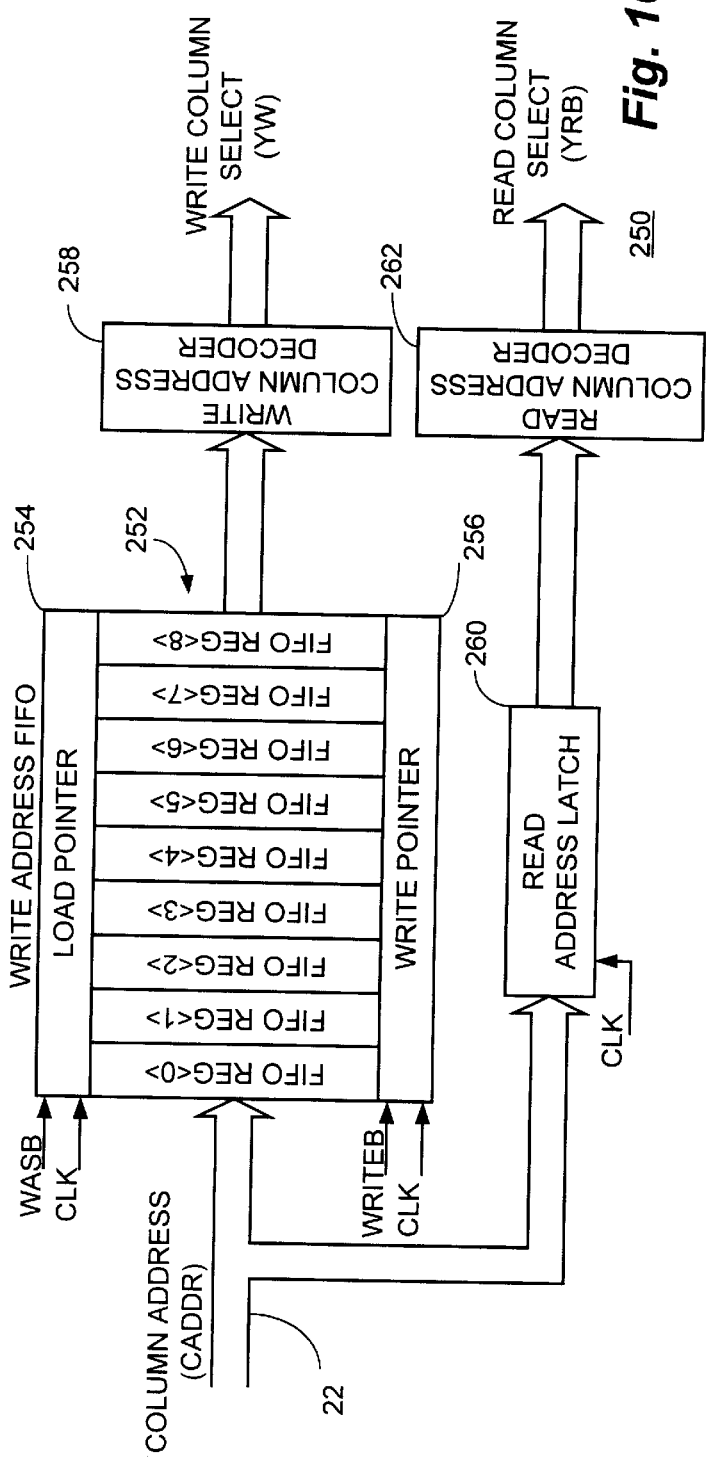
FIG. 10 is a simplified functional block diagram of an exemplary read and write column address path incorporating a look-ahead, wrap-around FIFO in accordance with the present invention.
Figure 11:
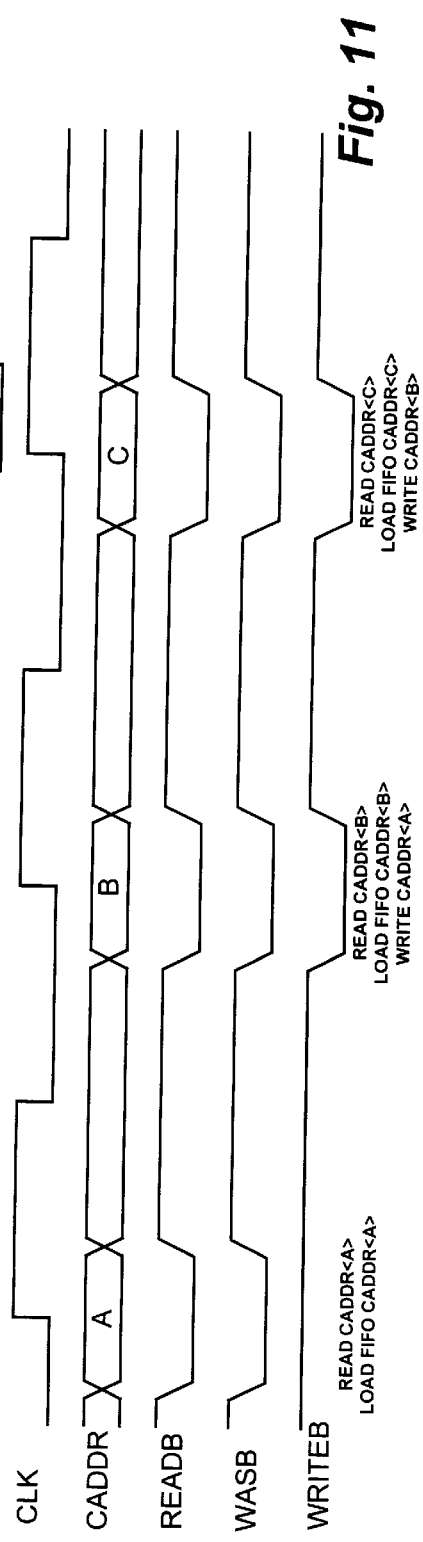
FIG. 11 is a timing diagram indicating the relationship among a number of the signals illustrated in FIG. 10 in a read-modify-write operation.

With reference additionally now to FIGS. 10 and 11 a simplified functional block diagram of an exemplary read and write column address path 250 is shown which incorporates a look-ahead, wrap-around write address FIFO 252 in accordance with the present invention as well as a corresponding timing diagram indicating the relationship among a number of the signals illustrated in a read-modify-write operation.

The write address FIFO 252 registers (FIFO REG<0> through FIFO REG<8> in this exemplary embodiment) of the address path 250 are coupled to the column address bus 22 and have an associated load pointer 254 and write pointer 256. The load pointer 254 receives the WASB and CLK signals as control inputs while the write pointer 256 receives the WRITEB and CLK signals. Output from the write address FIFO 252 is provided to a write column address decoder 258 to provide write column select ("YW") signal outputs.

The column address bus 22 is also coupled to a read address latch 260 which is also coupled to receive the CLK signal input. Output from the read address latch 260 is provided to a corresponding read column address decoder 262 to provide read column select ("YRB") signal outputs.

In operation, although there is only one common set of column address inputs on the column address bus 22 for reading and writing operations, the write address FIFO 252 and independent internal read and write address and data paths allow simultaneous read/write operation which effectively doubles the data rate for read-modify-write cycles.

For a read cycle, the column address is loaded into the write address FIFO 252 for use in a later cycle. In each clock cycle where the write address strobe ("WASB") is active "low", the in-coming column address is loaded into the eight stage FIFO 252. Although the FIFO 252 stores eight addresses, there are nine stages so that the load pointer 254 can "look-ahead" for improved FIFO 252 speed. In each write cycle (WRITEB "low"), a write address is read from the FIFO 252 and sent to the write column address decoder 258. A column address can be loaded into the FIFO 252 during a read cycle. This means that the read address can be stored in the FIFO 252 and retrieved in a subsequent write cycle without having to supply a write address to the macro. In this regard, loading an address during a non-read cycle is not prohibited. However, being able to load an address during a read cycle for the subsequent write cycle makes read-modify-write cycles significantly more efficient and allows for greater interface bandwidth.

With reference additionally now to FIG. 12A, a functional block diagram of a load word bar ("LWORDB") look-ahead, wrap-around FIFO of the present invention is shown illustrating the interconnection of a single column address write shift register 1 (shift register 140 of FIG. 7) in conjunction with eight column address write shift registers 2 (shift register 204 of FIG. 8) in a single stage look-ahead configuration.

In this embodiment, the data input 144 ("D") of the left-most shift register 140 is coupled to the data output 154 ("Q<8>") of the right-most shift register 204. The data output 154 ("Q<0>") of the shift register 140 is, in turn, coupled to the data input 144 ("D") of the adjacent shift register 204 and so on. The load word bar signal ("LWORDB<0>") from shift register 140 and the corresponding signals ("LWORDB<1:8>") are each output on respective lines 152 as previously described. In operation, only one of the LWORDB<0> through LWORDB<8> lines is active at one time.

With reference additionally now to FIG. 12B, a functional block diagram of a load word bar ("LWORDB") look-ahead, wrap-around FIFO of the present invention is shown illustrating the interconnection of two column address write shift registers 1 (shift register 140 of FIG. 7) in conjunction with nine column address write shift registers 2 (shift register 204 of FIG. 8) in a two stage look-ahead configuration.

In this embodiment, the data input 144 ("D") of the left-most shift register 140 is again coupled to the data output 154 ("Q<9>") of the right-most shift register 204. The data output 154 ("Q<0>") of the shift register 140 is, in turn, coupled to the data input 144 ("D") of another adjacent shift register 140, which is then coupled to the data input 144 of a first one of a series of shift registers 204 and so on. The load word bar signal ("LWORDB<0:1>") from the two shift registers 140 and the corresponding signals ("LWORDB<2:9>") are each output on respective lines 152 as previously described. In operation, two consecutive ones of the LWORDB<0> through LWORDB<9> lines will be active at any one time.

Figure 13:
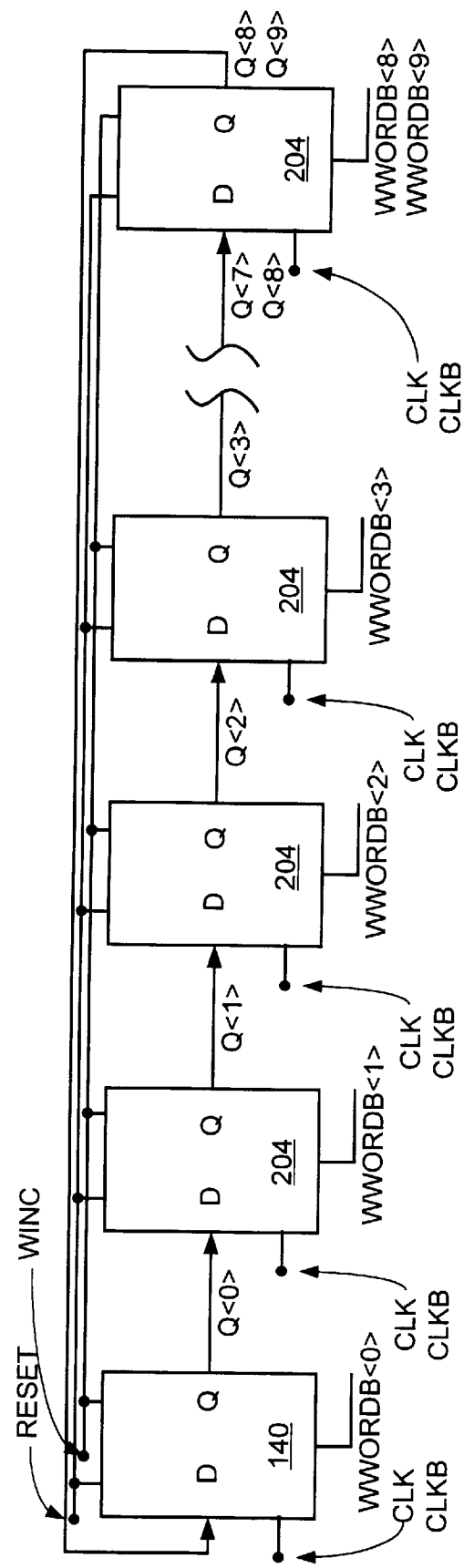
FIG. 13 is another functional block diagram of an embodiment of a write word ("WWORD") look-ahead, wrap-around FIFO of the present invention illustrating the interconnection of a single column address write shift register 1 (FIG. 7) in conjunction with eight or nine column address write shift registers 2 (FIG. 8) in either a single or dual stage look-ahead configuration.

With reference additionally now to FIG. 13, another functional block diagram of a write word bar ("WWORDB") look-ahead, wrap-around FIFO of the present invention is shown illustrating the interconnection of a single column address write shift register 1 (shift register 140 of FIG. 7) in conjunction with eight or nine column address write shift registers 2 (shift register 204 of FIG. 8) in either a single or dual stage look-ahead configuration.

In this embodiment, the data input 144 ("D") of the left-most shift register 140 is coupled to the data output 154 ("Q<8>" or "Q<9>" depending on whether the FIFO is a single or dual stage look-ahead device) of the right-most shift register 204. The data output 154 ("Q<0>") of the shift register 140 is, in turn, coupled to the data input 144 ("D") of the adjacent shift register 204 and so on. The write word bar signal ("WWORDB<0>") from shift register 140 and the corresponding signals ("WWORDB<1:8>" or "WWORDB<1:9>") are each output on respective lines 152 as previously described.

Figure 14A:
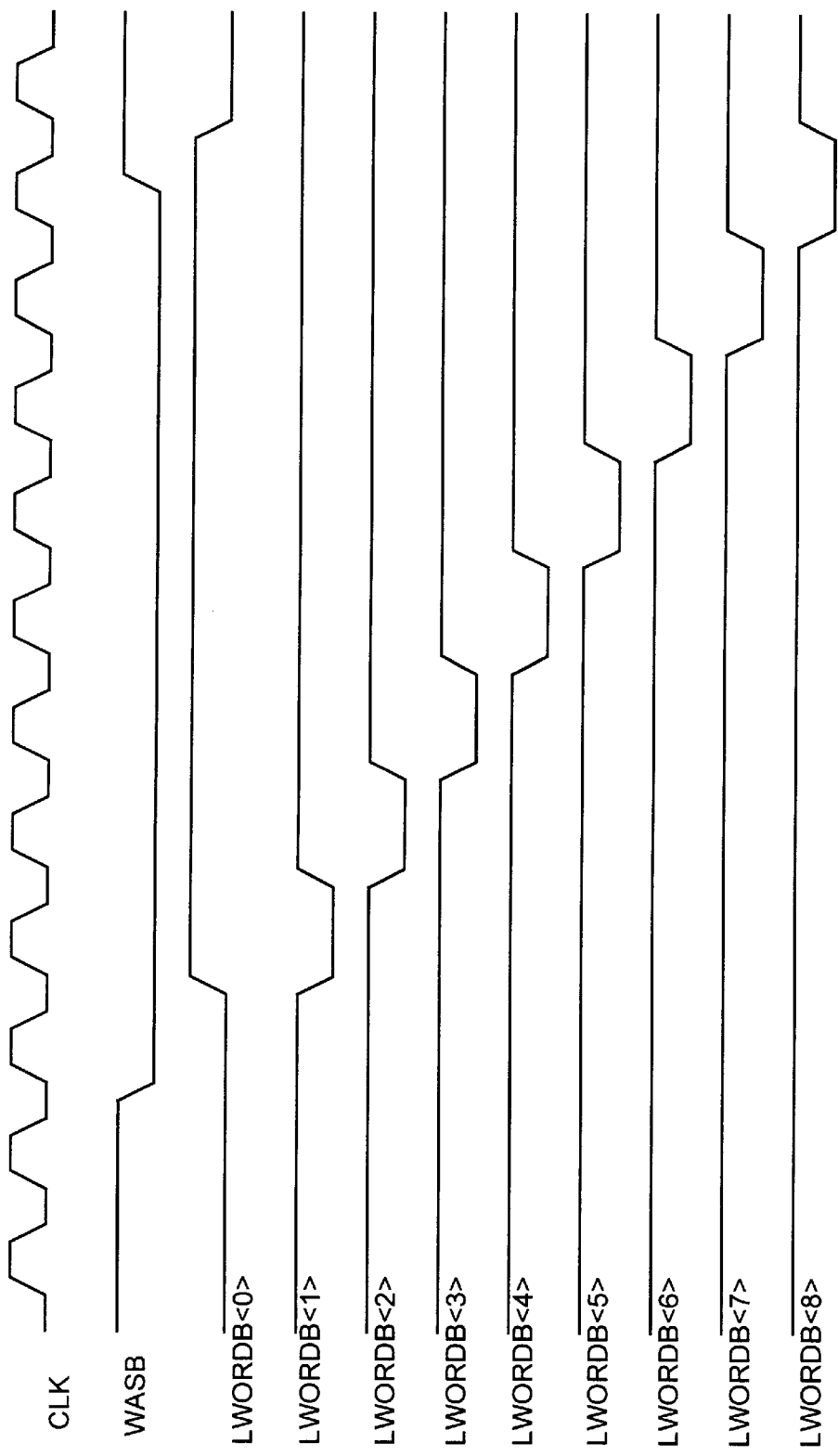
FIGS. 14A and 14B are representative timing diagrams for one cycle look-ahead FIFO loading and two cycle look-ahead FIFO loading respectively in accordance with the technique of the present invention.

With reference additionally now to FIG. 14A, a representative timing diagram is shown for one cycle look-ahead FIFO loading in accordance with the technique of the present invention. As can be seen, the single cycle loading function has two critical timing edges.

Figure 14B:
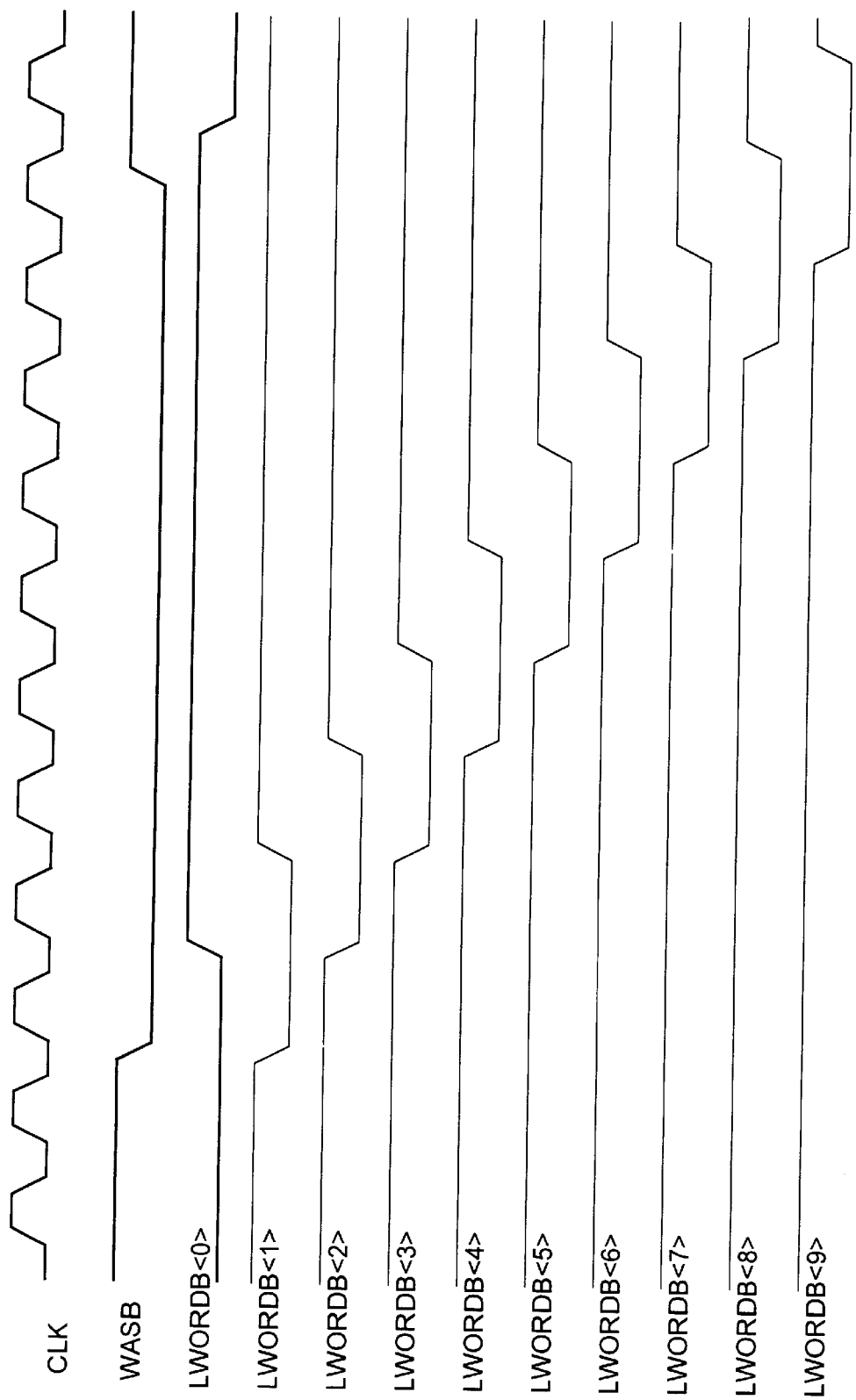

With reference additionally now to FIG. 14B, a representative timing diagram is shown for two cycle look-ahead FIFO loading in accordance with the technique of the present invention. In comparison to the single cycle loading of the preceding figure, the two cycle loading function has only a single critical timing edge.

While there have been described above the principles of the present invention in conjunction with specific implementations and device processing technology, it is to be clearly understood that the foregoing description is made only by way of example and not as a limitation to the scope of the invention. Particularly, it is recognized that the teachings of the foregoing disclosure will suggest other modifications to those persons skilled in the relevant art. Such modifications may involve other features which are already known per se and which may be used instead of or in addition to features already described herein. Although claims have been formulated in this application to particular combinations of features, it should be understood that the scope of the disclosure herein also includes any novel feature or any novel combination of features disclosed either explicitly or implicitly or any generalization or modification thereof which would be apparent to persons skilled in the relevant art, whether or not such relates to the same invention as presently claimed in any claim and whether or not it mitigates any or all of the same technical problems as confronted by the present invention. The applicants hereby reserve the right to formulate new claims to such features and/or combinations of such features during the prosecution of the present application or of any further application derived therefrom.

What is claimed is:

1. A method for loading a FIFO comprising:
   providing N logical locations;
   providing N+1 latch stages; and
   providing N+1 load pointer signals, wherein two load pointer signals are contemporaneously enabled during a FIFO load operations:
   wherein a first latch stage receives an active first load pointer signal causing the first latch stage to transparently receive input data;
   concurrently a second latch stage receives a second load pointer signal causing the second latch stage to transparently receive input data;
   in response to a FIFO load command, the first load pointer signal goes inactive, latching data into the first latch stage, the second load pointer signal remains active, and a transparent path for input data to the second latch stage is maintained;
   substantially simultaneously with loading the first latch stage, a third load pointer signal goes active causing a third latch stage to transparently receive input data; and
   following the execution of the load command, the first latch stage contains latched data, while the load pointer signals for the second and third latch stages are active allowing a transparent path for input data to both the second and third latch stages.

2. The method of claim 1 further comprising:
   storing data in an N$-1^{th}$ latch stage in response to a load command;
   latching data into the N$-1^{th}$ latch stage by bringing the N$-$1th load pointer inactive and retaining an Nth load pointer signal in the active state; and
   substantially simultaneously with loading an N$^{th}$ FIFO location, asserting an N+1$^{th}$ load pointer signal to the active state resulting in load pointer signals for an N$^{th}$ and N+1$^{th}$ latch stages being active, allowing data to asynchronously pass to both the N$^{th}$ and N+1$^{th}$ latch stages as a precondition for a next FIFO load command.

3. The method of claim 2 wherein the FIFO load pointers wrap-around when a load pointer exceeds N+1.

4. The method of claim 1 wherein the method of loading a FIFO comprises loading a FIFO integrated circuit.

5. A method for loading a FIFO comprising:
   providing N logical locations physically composed of N+2 latch stages;
   providing N+2 load pointer signals wherein three load pointer signals;
   wherein a first latch stage receives an active first load pointer signal causing the first latch stage to transparently receive input data;
   concurrently second and third latch stages receive second and third active load pointer signals, respectively, causing the second and third latch stages to transparently receive input data;
   in response to a FIFO load command, the first load pointer signal goes inactive, latching data into the first latch stage, the second and third load pointer signals remain active, maintaining a transparent oath for input data to the second and third latch stages; and
   substantially simultaneously with loading the first latch stage, a fourth load pointer signal goes active making the fourth stage transparent to input data, and, following the execution of the load command, the first latch stage contains latched data, while the load pointer signals for the second, third, and fourth latch stages are active allowing a transparent oath for input data to the second, third, and fourth latch stages.

6. The method of claim 5 further comprising: storing data in an N$-1^{th}$ latch stage in response to a load command;
   latching data into the N$-1^{th}$ latch stage by bringing an N$-1^{th}$ load pointer signal inactive, retaining N$^{th}$ and N+1$^{th}$ load pointer signals in the active state; and substantially simultaneously with loading an $N^{th}$ FIFO location, asserting an $N+2^{th}$ load pointer signal to the active state resulting in load pointer signals for $N^{th}$, $N+1^{th}$, and $N+2^{th}$ latch stages being active allowing data input to asynchronously pass to the $N^{th}$, $N+1^{th}$, and $N+2^{th}$ latch stages as a precondition for a next FIFO load command.

7. The method of claim 6 further comprising a wrap-around mode.

8. The method of claim 7 wherein the method of loading a FIFO comprises loading a FIFO integrated circuit.

* * * * *

UNITED STATES PATENT AND TRADEMARK OFFICE
CERTIFICATE OF CORRECTION

PATENT NO. : 6,622,198 B2
DATED : September 16, 2003
INVENTOR(S) : Oscar Frederick Jones, Jr.

Page 1 of 1

It is certified that error appears in the above-identified patent and that said Letters Patent is hereby corrected as shown below:

<u>Column 11,</u>
Line 68, "operations" should be -- operation --.

<u>Column 12,</u>
Line 40, ";" should be -- : --.
Lines 51 and 59, "oath" should be -- path --.

Signed and Sealed this

Twenty-first Day of March, 2006

JON W. DUDAS
*Director of the United States Patent and Trademark Office*